United States Patent [19]

Nishino et al.

[11] Patent Number: 4,624,486
[45] Date of Patent: Nov. 25, 1986

[54] STRUCTURE AT RESIN PIPE CONNECTIONS

[75] Inventors: Yoshinori Nishino, Yamato-takada; Masahiko Yamamoto, Nishinomiya; Tadayoshi Uda, Izumi; Tomoyoshi Kanazawa, Kobe; Kenji Nakagawa, Osaka, all of Japan

[73] Assignee: Hitachi Zosen Corporation, Osaka, Japan

[21] Appl. No.: 484,256

[22] Filed: Apr. 12, 1983

[30] Foreign Application Priority Data

Nov. 12, 1982 [JP] Japan ............... 57-172137[U]
Nov. 12, 1982 [JP] Japan ............... 57-172138[U]
Nov. 12, 1982 [JP] Japan ............... 57-172139[U]

[51] Int. Cl.$^3$ ............................... F16L 9/14
[52] U.S. Cl. ....................... 285/55; 285/292; 285/336; 285/363; 285/370; 285/371; 285/423; 285/919
[58] Field of Search ............. 285/423, DIG. 16, 370, 285/371, 397, 398, DIG. 10, 45, 55, 336, 349, DIG. 20, 292, 363

[56] References Cited

U.S. PATENT DOCUMENTS

| 1,001,682 | 8/1911 | Pratt | 285/423 X |
| 1,484,355 | 2/1924 | Moir et al. | 285/423 X |
| 1,945,279 | 1/1934 | Kraner | 285/370 X |
| 3,508,766 | 4/1970 | Kessler et al. | 285/370 X |
| 3,612,580 | 10/1971 | Jones | 285/423 X |
| 4,147,381 | 4/1979 | Schwarz | 285/371 X |

FOREIGN PATENT DOCUMENTS

| 1014803 | 8/1957 | Fed. Rep. of Germany | 285/370 |
| 325217 | 12/1957 | Switzerland | 285/370 |

Primary Examiner—Dave W. Arola
Attorney, Agent, or Firm—Joseph W. Farley

[57] ABSTRACT

A structure at a connection where at least two resin pipes are connected to each other end-to-end. The structure is characterized by annular resin body means provided on the inner periphery of the end of at least one of the resin pipes and having at least one end positioned in an annular recessed portion formed in the inner periphery of said one resin pipe. Since the above-mentioned end (which is more subject to the action of internal fluid than the other end) is positioned in the annular recessed portion, the resin body means is not eroded by the internal fluid.

5 Claims, 11 Drawing Figures

STRUCTURE AT RESIN PIPE CONNECTIONS

The present invention relates to a structure at resin pipe connections, and more particularly to a structure at a connection where at least two resin pipes are connected to each other end-to-end, the structure having an annular inner resin body means provided on the inner periphery of the end of at least one of the resin pipes.

At such a resin pipe connection, annular inner resin body means is provided on the inner periphery of the connected end of at least one resin pipe for giving rigidity to the connected end of the pipe and protecting the end of the pipe. Further when such inner resin body means is provided over the inner peripheries of the opposed ends of two resin pipes connected together end-to-end, the resin body means not only gives rigidity to the opposed ends and protects the inner peripheries of the ends but also connects the two pipes together firmly.

As will be described later in detail with reference to drawings, the inner resin body means heretofore known is liable to erosion at one end or both ends thereof due to the action of the internal fluid. In some cases, such erosion could further develop into the resin body means seriously, rendering the resin body means unable to perform the contemplated function.

An object of the present invention is to provide a structure at resin pipe connections which has inner resin body means free of the above-mentioned problem of erosion.

In order to fulfill this object, the present invention provides a structure at a connection where at least two resin pipes are connected to each other end-to-end, the structure having annular inner resin body means provided on the inner periphery of the end of at least one of the resin pipes, the resin body means having at least one end positioned in an annular recessed portion formed in the inner periphery of said one resin pipe.

Various features and advantages of the invention will be readily understood from the following description of embodiments with reference to the accomapnying drawings, in which.

Before describing some embodiments of the invention, a conventional structure at a resin pipe connection will be described with reference to FIG. 1.

Figure 1:
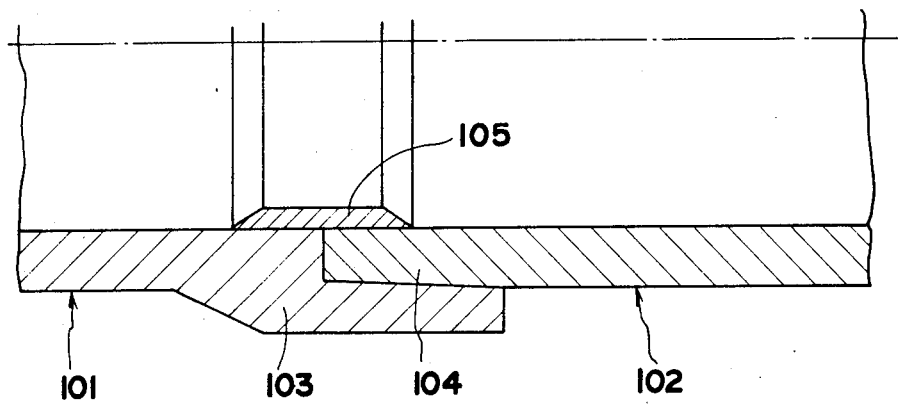
FIG. 1 is a veiw in longitudinal section showing a conventional structure at a resin pipe connection.

Referring to FIG. 1, a resin pipe 101 having a socket 103 at one end is connected to a resin pipe 102 having a spigot 104 by the insertion of the spigot 104 in the socket 103. The resin pipes 101, 102 have incorporated therein reinforcing fibers, such as reinforcing fiber fabrics prepared by weaving rovings of reinforcing fibers into a sheet, and reinforcing fiber mats prepared by forming filaments of reinforcing fibers into a sheet with use.. of a binder. An annular inner resin body 105 is provided over the inner periphery of the socket 103 and the inner periphery of the spigot 104 for firmly connecting the two pipes 101, 102 together. In the following description, reinforcing fiber fabrics and reinforcing fiber mats will be referred to collectively as reinforcing fiber sheets.

Figure 2:
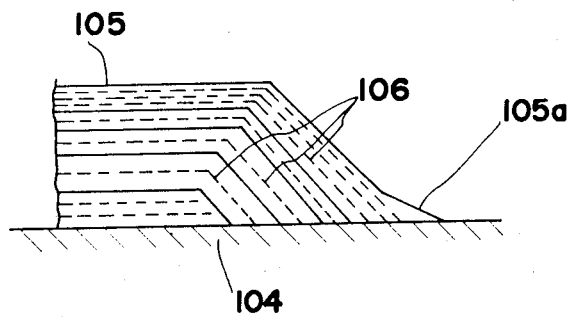
FIG. 2 is an enlarged view showing an inner resin body of the structure.
Figure 3A:
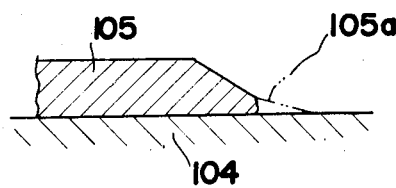
FIGS. 3a to 3d are views illustrating states of erosion in the inner resin body.
Figure 3B:
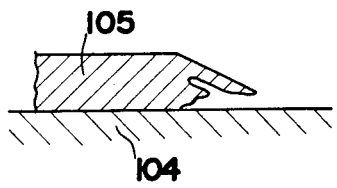
Figure 3C:
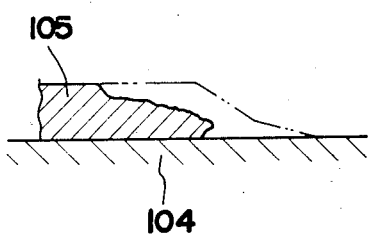
Figure 3D:
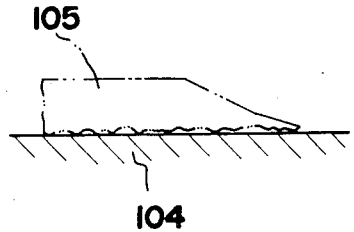

As shown in FIG. 2, the inner resin body 105 is formed by laminating plies of resin each incorporating a reinforced fiber sheet 106. As the result of the lamination, the resin body 105 is formed at each end with a thin edge portion 105a, which tends to easily release the curing accelerator contained in the resin and is therefore difficult to cure completely. Consequently, if the fluid to be transported is seawater, the thin edge portion 105a is attacked by the seawater to develop initial erosion. When the resin body 105 is in a low-speed flow zone, such erosion occurs only in the thin edge portion 105a (FIG. 3a), but if it is in a medium-speed flow zone, the erosion will develop into the inner portion of the resin body 105 as shown in FIG. 3b. In a high-speed flow zone, a considerable portion of the resin body 105 will be worn away as shown in FIG. 3c. Further if the high-speed flow of the fluid involves cavitation, the resin body 105 will be entirely worn away. To whatever extent such erosion may develop in the resin body 105, the erosion could lead to a break in the connection between the two pipes 101, 102 or a leak, producing a serious problem in the fluid transport piping system.

Structures at resin pipe connections according to the invention are free of such a problem as will be described below with reference to FIGS. 4 to 8.

Figure 4:
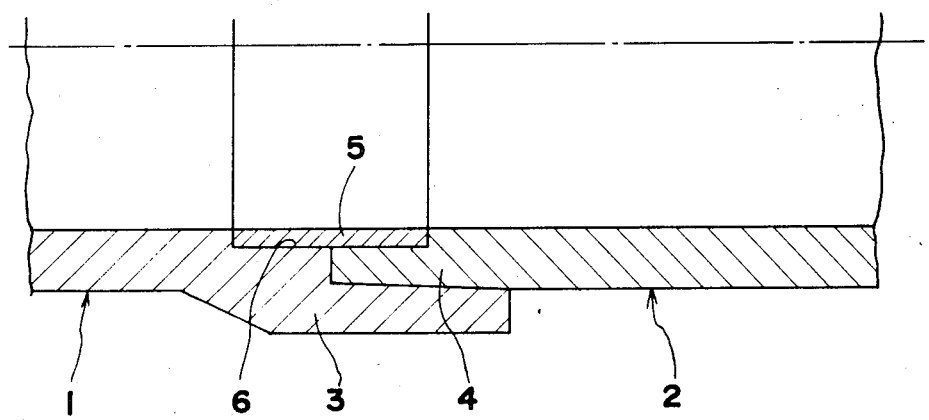
FIG. 4 is a view in longitudinal section showing the structure of a first embodiment of the invention at a resin pipe connection.

Referring to FIG. 4, a resin pipe 1 incorporating reinforcing fiber sheets therein and having a socket 3 at one end is connected to a resin pipe 2 incorporating fiber sheets therein and having a spigot 4 at one end, with the spigot 4 inserted in the socket 3. An annular recessed portion 6 is formed in the inner periphery of the socket 3 and the inner periphery of the spigot 4. An annular inner resin body 5 having reinforcing fiber sheets therein is provided in the annular recessed portion 6. The inner periphery of the resin body 5 is completely or substantially flush with the inner peripheries of the two pipes 1, 2.

With the structure thus formed at the resin pipe connection, opposite ends of the inner resin body 5, which are positioned completely in the annular recessed portion, are not formed with any thin edge portion, nor will they be subjected directly to the action of inner fluid, so that the inner resin body 5 will encounter no problem of erosion.

Figure 5:
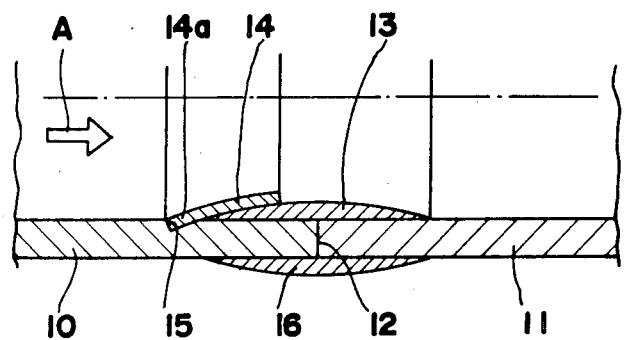
FIG. 5 is a view in longitudinal section showing the structure of a second embodiment of the invention at a resin pipe connection.

FIG. 5 shows a structure at the connection of two resin pipes 10, 11 having reinforcing fiber sheets incorporated therein and joined to each other end-to-end as indicated at 12. An annular connecting resin body 13 is provided on the inner peripheries of the opposed ends of the two pipes 10. 11. An annular reinforcing resin body 14 partly covering the connecting resin body 13 has one end 14a which is the upstream end thereof with respect to the flow of fluid A and which is positioned in an annular recessed portion 15 formed in the inner periphery of one of the resin pipes, 10. An annular outer resin body 16 is provided over the outer peripheries of the opposed ends of the two pipes 10, 11 for connecting the two pipes 10, 11 together with enhanced strength. The reinforcing resin body 14 is formed by laminating plies of resin each incorporating a reinforcing fiber sheet therein. It is advantageous to apply a film over the inner periphery of the reinforcing resin body 14 immediately after the lamination to thereby prevent release of the curing accelerator from the resin, since the resin can then be cured rapidly and effectively.

With the structure thus formed at the pipe connection, the upstream end 14a of the reinforcing resin body 14 which end is especially subject to the action of fluid is positioned in the annular recessed portion 15, so that the reinforcing resin body 14 and the connecting resin body 13 having its upstream end thereby protected are free of the problem of erosion in the low- to medium-speed flow zones of piping systems.

Figure 6:
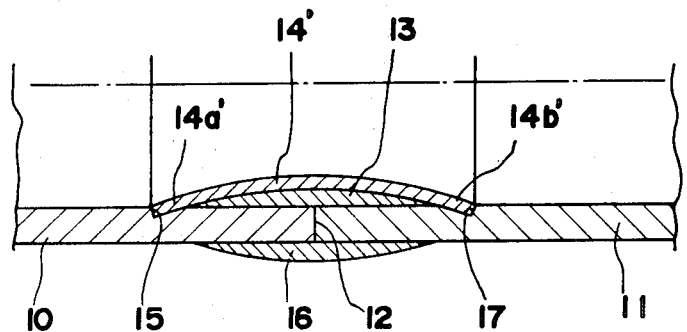
FIG. 6 is a view in longitudinal section showing the structure of a third embodiment of the invention at a resin pipe connection.

FIG. 6 shows a structure at a resin pipe connection which is similar to the one shown in FIG. 5 except that an annular reinforcing resin body 14' completely covers a connecting resin body 13 and has opposite ends 14a', 14b' which are respectively positioned in annular recessed portions 15, 17 formed in the inner peripheries of resin pipes 10, 11. This structure is advantageously usable especially in the high-speed flow zones of piping systems irrespective of the direction of flow of fluid.

Figure 7:
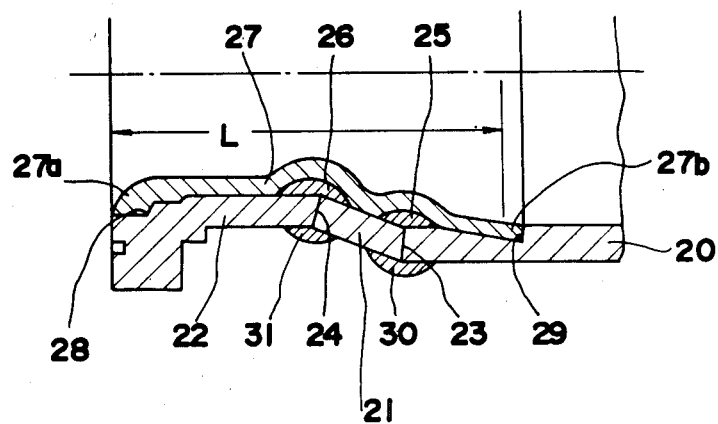
FIG. 7 is a view in longitudinal section showing the structure of a fourth embodiment of the invention at a resin pipe connection.

FIG. 7 shows a structure at a connection where a main resin pipe 20 and an intermediate resin pipe 21 are connected together end-to-end as at 23, and the intermediate resin pipe 21 is further connected to a joint resin pipe 22 end-to-end as at 24. The joint resin pipe 22 is connected to a valve pipe (not shown) for controlling the flow of the fluid to be transported. The main resin pipe 20, the intermediate resin pipe 21 and the joint resin pipe 22 have reinforcing fiber sheets incorporated therein. A first annular connecting resin body 25 is provided on the inner peripheries of the opposed ends of the main resin pipe 20 and the intermediate resin pipe 21. A second annular connecting resin body 26 is provided on the inner periphery of the other end of the intermediate resin pipe 21 and on the inner periphery of one end of the joint resin pipe 22. Completely covering the first and second connecting resin bodies 25, 26 is an annular reinforcing resin body 27 having one end 27a positioned in an annular recessed portion 28 formed in the inner periphery of the joint resin pipe 22 and the other end 27b positioned in an annular recessed portion 29 formed in the inner periphery of the main resin pipe 20. The reinforcing resin body 27 is formed by laminating plies of resin each having a reinforcing fiber sheet incorporated therein and covering the inner surface of the laminate with a film for effective curing. The innermost resin layer of the body 27 is an erosion resistant layer for improved reinforcement. Indicated at 30 is a first annular outer resin body provided on the outer peripheries of the opposed ends of the main resin pipe 20 and the intermediate resin pipe 21, and at 31 is a second annular outer resin body provided on the outer peripheries of the opposed ends of the intermediate resin pipe 21 and the joint resin pipe 22.

With the structure thus formed at the pipe connection, the reinforcing resin body 27 having its opposite ends 27a, 27b positioned in the annular recessed portions 28, 29, includes the innermost layer which is in the form of an erosion resistant resin layer and is therefore reinforced in itself, so that the structure is advantageous to use in a high-speed cavitation zone (over a certain distance downstream from the valve pipe) L of the transport piping system.

Figure 8:
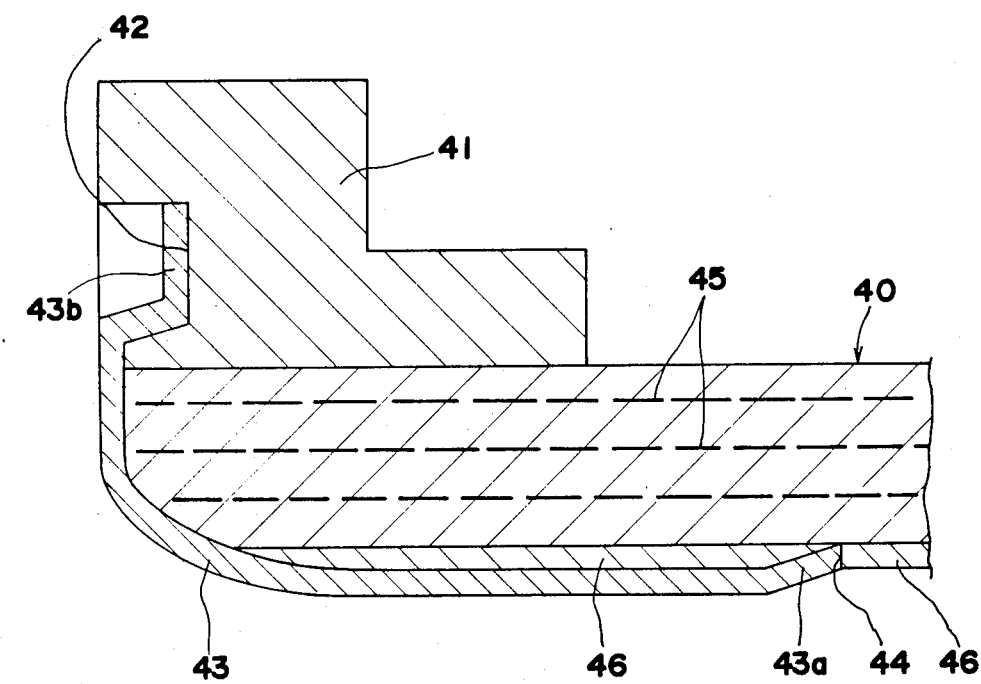
FIG. 8 is a view in longitudinal section showing the structure of a fifth embodiment of the invention at a resin pipe connection.

FIG. 8 shows the right half only of a structure at a connection where a resin pipe 40 having a Van Stone flange 41 at one end is connected end-to-end to an unillustrated resin pipe (which may be a valve pipe) similarly having a Van Stone flange at one end, with use of suitable fastening means. The Van Stone flange 41 is formed with an annular sealing recessed portion 42. An annular inner resin body 43 formed on the inner periphery of the end of the resin pipe 40 further extends onto the side surface of the flange 41. The resin body 43 has one end 43a positioned in an annular recessed portion 44 formed in the inner periphery of the resin pipe 40 and the other end 43b positioned in the sealing recessed portion 42 of the flange 41. The resin pipe 40 has incorporated therein reinforcing fiber sheets 45 and an erosion resistant resin layer 46 serving as its innermost layer.

With the structure thus formed at the connection, the inner resin body 43 has one end 43a which is positioned in the annular recessed portion 44 in the inner periphery of the resin pipe 40 and the other end 43b positioned at an outer portion which is free of the action of internal fluid, so that the resin body 43 will not be eroded by the internal fluid. Furthermore, the resin body 43, covering the lateral end face of the resin pipe 40, eliminates the likelihood that the innermost erosion resistant layer 46 will be separated off or eroded by the action of fluid.

What is claimed is:

1. A pipe connection structure wherein one end of a first resin pipe is opposed to one end of a second resin pipe in direct face-to-face contact, the structure comprising an inwardly projecting annular connecting resin body bridging over the inner peripheries of the opposed ends of the first and second pipes for connecting them together, and an annular reinforcing resin body at least partly covering the connecting resin body and having an end portion extending on the first pipe beyond one end of the connecting resin body, said end portion being received in an annular recess formed in the inner periphery of the first pipe.

2. A structure as defined in claim 1 wherein the reinforcing resin body completely covers the connecting resin body and has an opposite end portion extending on the second pipe beyond the other end of the connecting resin body, said opposite end portion being received in a second annular recess formed in the inner periphery of the second pipe.

3. A pipe connection structure wherein one end of a first resin pipe is opposed to one end of a second resin pipe, and one end of a third resin pipe is opposed to the other end of the second resin pipe, the structure comprising a first inwardly projecting annular connecting resin body bridging over the inner peripheries of the opposed ends of the first and second pipes for connecting them together, a second inwardly projecting annular connecting resin body bridging over the inner peripheries of the opposed ends of the second and third pipes for connecting them together, and an annular reinforcing resin body completely covering the first and second connecting resin bodies, said annular reinforcing resin body having one end portion extending on the first pipe beyond one end of the first connecting resin body and being received in a first annular recess formed in the inner periphery of the first pipe, and said annular reinforcing resin body having an opposite end extending on the third pipe beyond one end of the second connecting resin body and being received in a second annular recess formed in the inner periphery of the third pipe.

4. An end structure of a resin pipe comprising a flange fixed to the outer periphery of the pipe at one end thereof and provided with a seal receiving recess on the side thereof close to the pipe end face, and an annular end covering resin body extending from the inner periphery of said one end of the pipe to the flange, said annular resin body having one end positioned in an inner annular recess formed in the inner periphery of said one end of the pipe and having an opposite end positioned in the seal receiving recess of the flange.

5. A structure as defined in claim 4 wherein the resin pipe has an innermost erosion resistant resin layer, and said inner annular recess is formed in the erosion resistant layer.

* * * * *